US007118478B2

(12) United States Patent
Fayter et al.

(10) Patent No.: US 7,118,478 B2
(45) Date of Patent: Oct. 10, 2006

(54) SELF-VERIFYING GAMING VOUCHER HAVING SECONDARY MACHINE READABLE INDICIA

(75) Inventors: Peter C. Fayter, Collings Lakes, NJ (US); William N. Pangoras, Absecon, NJ (US)

(73) Assignee: Harrah's Operating Company, Inc., Las Vegas, NV (US)

( * ) Notice: Subject to any disclaimer, the term of this patent is extended or adjusted under 35 U.S.C. 154(b) by 318 days.

(21) Appl. No.: 10/255,160

(22) Filed: Sep. 25, 2002

(65) Prior Publication Data

US 2004/0058728 A1 Mar. 25, 2004

(51) Int. Cl.
*A63F 13/00* (2006.01)

(52) U.S. Cl. .............. 463/25; 235/462.01; 235/462.02; 235/462.07; 463/16

(58) Field of Classification Search ............ 463/25–29, 463/42, 43, 16–19, 20–22, 24, 44; 377/8; 235/375–386, 462.01, 462.02, 462.07; 283/102, 283/73, 74; 700/91–93; 273/269, 274
See application file for complete search history.

(56) References Cited

U.S. PATENT DOCUMENTS 4,157,829 A * 6/1979 Goldman et al. ............. 463/17
4,494,197 A * 1/1985 Troy et al. ..................... 463/18
4,591,190 A * 5/1986 Clark ......................... 283/102
5,444,750 A * 8/1995 Stewart et al. ................. 377/8
5,475,205 A * 12/1995 Behm et al. ................ 235/375
5,791,990 A * 8/1998 Schroeder et al. ............ 463/17
5,935,000 A * 8/1999 Sanchez et al. ............... 463/17
5,938,200 A 8/1999 Markowicz et al.
6,048,269 A 4/2000 Burns et al.
6,110,044 A * 8/2000 Stern ........................... 463/29
6,111,953 A * 8/2000 Walker et al. ................ 380/51
6,170,744 B1 * 1/2001 Lee et al. .................... 235/380
6,212,504 B1 * 4/2001 Hayosh ....................... 705/64
6,347,794 B1 2/2002 Scrymgeour et al.
6,500,067 B1 * 12/2002 Luciano et al. ............... 463/25
6,505,179 B1 * 1/2003 Kara .......................... 705/50

(Continued)

OTHER PUBLICATIONS

Integrated Voucher System (IVS) for EZ Pay—System Capabilities, International Game Technology, Las Vegas, Nevada, printout from web site: http://www.igtproducts/Systems/EZpay/IVS-SystemCapabilities.asp, printout date: Aug. 15, 2002, Copyright 2002, IGT, 4 pages.

(Continued)

*Primary Examiner*—Xuan M. Thai
*Assistant Examiner*—Ross Williams
(74) *Attorney, Agent, or Firm*—Fenwick & West LLP

(57) ABSTRACT

A gaming voucher is printed with first and second machine readable indicia. The first machine readable indicia represents a unique gaming voucher number. The monetary value of the gaming voucher and additional information about the gaming voucher is stored in a database remote from the gaming machine in association with the unique gaming voucher number. The second machine readable indicia represents the asset number of the gaming machine that produced the gaming voucher, the value of the gaming voucher, and a portion of the unique gaming voucher number. The gaming voucher is self-validating during a counting process in a count room, and thus no access to the remote database is required to initially verify the authenticity of the gaming voucher. The information encoded in the first and second machine readable indicia may also be used in conjunction with the data in the remote database during a voucher redemption process to verify the authenticity of the gaming voucher.

12 Claims, 6 Drawing Sheets

U.S. PATENT DOCUMENTS

| | | | | |
|---|---|---|---|---|
| 6,652,380 | B1 * | 11/2003 | Luciano | 463/25 |
| 6,679,775 | B1 * | 1/2004 | Luciano et al. | 463/25 |
| 6,834,794 | B1 * | 12/2004 | Dabrowski | 235/375 |
| 2001/0044337 | A1 | 11/2001 | Rowe et al. | |
| 2002/0128059 | A1 | 9/2002 | Baltz et al. | |
| 2003/0008707 | A1 | 1/2003 | Walker et al. | |
| 2003/0042317 | A1 | 3/2003 | Behn et al. | |
| 2003/0057269 | A1 | 3/2003 | Brunner | |
| 2003/0062242 | A1 | 4/2003 | Hallowell et al. | |
| 2003/0073495 | A1 | 4/2003 | D'Amico et al. | |
| 2003/0078094 | A1 * | 4/2003 | Gatto et al. | 463/25 |
| 2003/0141359 | A1 * | 7/2003 | Dymovsky et al. | 235/375 |
| 2003/0162591 | A1 * | 8/2003 | Nguyen et al. | 463/29 |
| 2004/0016797 | A1 * | 1/2004 | Jones et al. | 235/379 |

OTHER PUBLICATIONS

EZ Pay Ticket System Overview, International Game Technology, Las Vegas, Nevada, printout from web site: http://www.igtproducts.com/igtproducts/Systems/EZpay/Overview.asp, printout date: Aug. 16, 2002, Copyright 2002, IGT, 3 pages.

Bar Code Glossary—Tharo Systems, Inc., printout from web site: http://www.tharo.com/glossary.htm, printout date: Aug. 15, 2002, 11 pages.

* cited by examiner

16

| GAMING VOUCHER NUMBER | MONETARY VALUE | ASSET NUMBER | ISSUANCE TIME/DATE | REDEMPTION STATUS |
|---|---|---|---|---|
| $VN_1$ | $MV_1$ | $AN_1$ | $T_1$ | Y |
| $VN_2$ | $MV_2$ | $AN_2$ | $T_2$ | N |
| • | • | • | • | • |
| • | • | • | • | • |
| • | • | • | • | • |
| $VN_n$ | $VN_n$ | $AN_n$ | $T_n$ | N |

*FIG. 2*

*(PRIOR ART)*

SELF-VERIFYING GAMING VOUCHER HAVING SECONDARY MACHINE READABLE INDICIA

The present invention relates to gaming machines, and more particularly to gaming vouchers output from gaming machines.

Slot machines with cashless (coinless) capabilities have been widely introduced throughout the casino gaming industry. Some slot machines output only gaming vouchers (also referred to as "ticket vouchers") in lieu of cash, whereas other slot machines output coins and/or gaming vouchers, depending upon the patron's request and/or the algorithms programmed into the slot machines. The gaming vouchers may be redeemed for cash, or may be fed back into a special slot machine gaming voucher acceptor or even a specially adapted bill validator to establish credit for subsequent game play.

One widely known cashless slot machine system is called EZ Pay™ Ticket System, available from International Game Technology, Reno, Nev. The EZ Pay system is generally described in U.S. Published application No. 2001/0044337 (Rowe et al.), incorporated herein by reference. Each gaming voucher in the EZ Pay system contains a unique identification number (serial number) which is physically applied to the gaming voucher as a bar code. FIG. 1 shows an example of a prior art gaming voucher, specifically, an EZ Pay gaming voucher. The gaming voucher includes the monetary value for the convenience of the patron. U.S. Pat. No. 6,048,269 (Burns et al.), incorporated herein by reference, also shows a cashless/coinless slot machine system similar to the EZ Pay system.

When an EZ Pay gaming voucher is generated by a gaming machine, a record is simultaneously created in a remote database that correlates to the gaming voucher. The remote database contains all of the necessary information about the gaming voucher to ensure proper accounting of gaming machine payouts and to allow for accurate gaming voucher redemptions. The information that may be included in the remote database for each voucher includes:

1. monetary value of gaming voucher
2. gaming machine (i.e., asset) that produced the gaming voucher
3. date and time of issuance of the gaming voucher
4. redemption status of the gaming voucher (i.e., redeemed, not yet redeemed)

When a patron presents a gaming voucher for redemption, either by feeding it into a gaming voucher acceptor or bill validator at a gaming machine, or presenting it at a cash window (e.g., casino cage) or other authorized paying entity, the monetary value printed on the gaming voucher is not relied upon as the actual value of the gaming voucher. Instead, the bar code of the gaming voucher is read by a bar code scanner and the information in the remote database is used to obtain the value of the gaming voucher and to determine if the gaming voucher has been previously redeemed. The information in the remote database is also used in other ways to check the likely authenticity of the gaming voucher. For example, the machine number that generated the gaming voucher and time/date values may be checked against other information in the remote database to determine if the ticket is authentic. These extra security measures reduce the likelihood of fraud in the printing and redemption of gaming vouchers.

Notwithstanding the relatively simple redemption process used in cashless systems, such as EZ Pay, there are still unmet needs associated with such systems, and casino operators still face numerous problems with such systems, some of which are outlined below:

1. There is no way to independently account for the gaming vouchers without accessing the gaming voucher redemption system that ties into the remote database.

2. Casinos are required by regulations to count all revenue producing documents without allowing any of the collected information to go outside of the room where the count is taking place. Accessing the gaming voucher redemption system may require electronic transmissions to occur in and out of the count room. (A count room is a secure room where drop boxes and slot cash storage boxes are opened and cash is counted. Gaming vouchers, such as EZ Pay gaming vouchers, that are redeemed by being fed back into a gaming voucher acceptor or bill validator at a gaming machine end up in a drop box or slot cash storage box.)

3. Casino accounting systems and/or count rooms may not have access to the gaming voucher redemption system.

4. Counting equipment runs significantly slower when access to a database identifying each gaming voucher is required.

5. The count room must identify the asset number of the gaming machine that produced each gaming voucher. This information is stored in the remote database and may not be printed on a gaming voucher in either human readable or machine readable form. Accordingly, access to the remote database of the gaming voucher redemption system may be required to obtain this information. As noted above, such access may not be available, or may even be prohibited by regulations.

6. A convention gaming voucher, such as an EZ Pay gaming voucher, may indicate the value and asset number of the gaming that produced the gaming voucher in human readable form. However, it is easy for casino patrons and/or casino employees to fraudulently alter human readable indicia. If access to the gaming voucher redemption system is not available in the count room, the human readable indicia will be relied upon in the count room and such alterations will not be detected during the counting process.

7. Gaming voucher acceptors or bill validators at gaming machines, as well as cage window attendants, have access to the remote database of the gaming voucher redemption system so that the value and authenticity of gaming vouchers presented for redemption can be verified. Nonetheless, it may still be possible to defeat present security measures designed to ensure that gaming vouchers are not fraudulently created and/or redeemed.

The present invention addresses these problems and unmet needs.

BRIEF SUMMARY OF THE INVENTION

A second machine readable indicia, such as a secondary bar code, is printed on the gaming voucher which contains at least the following information coded therein:

1. Identification of the asset that produced that gaming voucher.

2. Amount or value of the gaming voucher.

3. Identification code that associates the physical gaming voucher to the EZ Pay serial number represented by the conventionally printed EZ Pay bar code. In one example, the identification code is a portion of the EZ Pay serial number, such as the last two digits.

The second machine readable indicia allows count room employees to use machine readable scanning equipment, such as a bar code reader, identify the asset that produced the gaming voucher and the value of the gaming voucher. Count room employees thus do not need to rely upon tamper-prone human readable indicia, if any exists on such gaming vouchers, for such information. Furthermore, the identification code portion of the second machine readable indicia allows the count room employees to verify the integrity of the gaming voucher without requiring any communication with the EZ Pay gaming voucher redemption system. That is, the gaming voucher becomes "self-verifying." This process provides a higher level of security than existing verification procedures for EZ Pay gaming vouchers because the EZ Pay serial number does not become exposed during the count process to any systems external to the count room.

In addition to providing improved count room procedures, the second machine readable indicia increases the integrity of the process for redeeming gaming vouchers via gaming voucher acceptors or bill validators at gaming machines, or at cage windows. During such redemptions, the remote database of the gaming voucher redemption system is accessed so that the value and authenticity of gaming vouchers presented for redemption can be verified. However, if the security measures associated with the conventional EZ Pay serial number and associated remote database information were defeated, the second machine readable indicia provides an additional source of verification. For example, the asset number, gaming voucher value, and identification code of the EZ Pay serial number, as obtained from the second machine readable indicia, may be compared to the information obtained by scanning the conventional EZ Pay bar code (which is a unique serial number) and accessing the corresponding database record for the serial number which contains the asset number and value of the gaming voucher.

During either count room processing or redemption at cage windows, human readable indicia may also be used as a further check against fraudulent redemptions. For example, gaming vouchers typically include the value of the gaming voucher in human readable form for the convenience of the patron. However, one object of the present invention is to reduce or eliminate the necessity to rely upon such human readable indicia when redeeming gaming vouchers.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 2 shows the overall data structure of a prior art gaming voucher redemption system for tracking issued gaming vouchers;

DETAILED DESCRIPTION OF THE INVENTION

Figure 1:
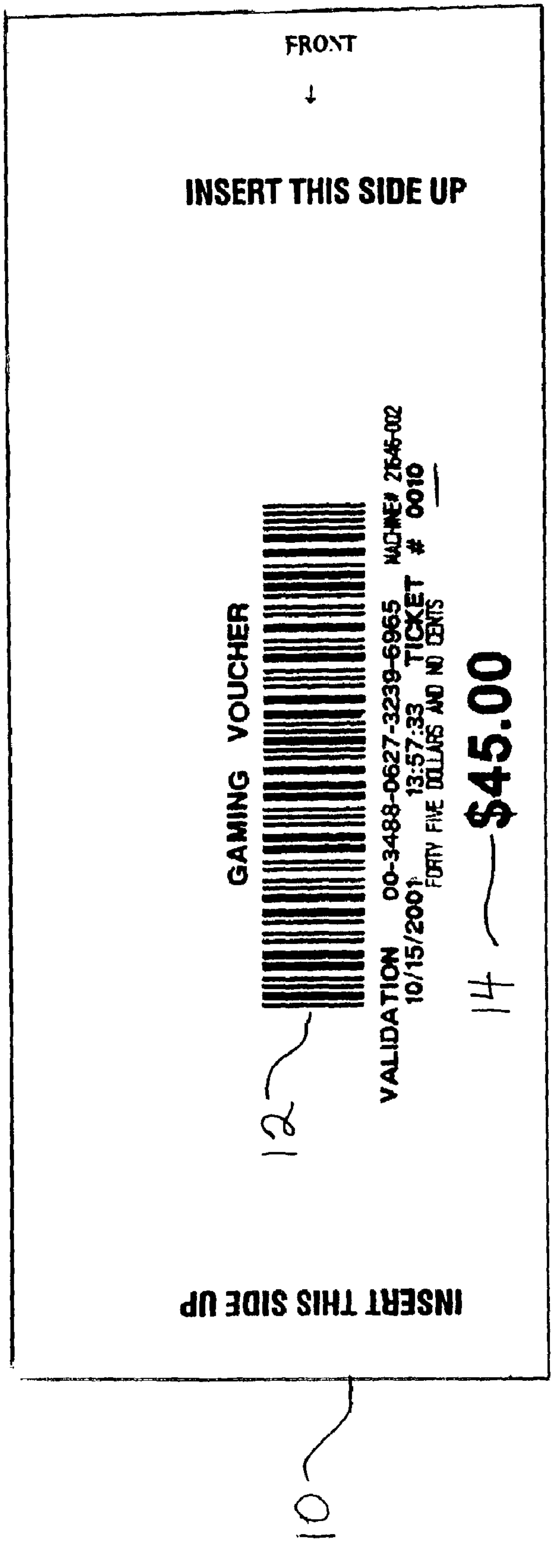
FIG. 1 (PRIOR ART)
FIG. 1 shows an example of a prior art gaming voucher.

Certain terminology is used herein for convenience only and is not to be taken as a limitation on the present invention. In the drawings, the same reference letters are employed for designating the same elements throughout the several figures.

FIG. 1 shows an example of a prior art EZ Pay gaming voucher 10. The gaming voucher 10 includes a first machine readable indicia in the form of a bar code symbol 12 representing a unique gaming voucher number. The bar code symbol 12 is also referred to herein as the "center bar code." The bar code symbol 12 does not include any data representing the value of the gaming voucher or any data representing the asset number of the gaming machine that printed out the gaming voucher 10. Instead, this data is stored in a database remote from the gaming machine in association with the unique gaming voucher number represented by the bar code symbol 12. The gaming voucher 10 also optionally includes the value 14 of the gaming voucher in human readable form for the convenience of the patron. The human readable value 14 may also be used by casino personnel as a double check during a manual redemption process. The casino personnel will use the data in the remote database to verify the value of the gaming voucher 10.

The bar code symbol in one embodiment of the EZ Pay gaming voucher is a USS-I 2/5 type bar code.

If the gaming voucher 10 has a magnetic strip, then the first machine readable indicia will be the unique gaming voucher number encoded onto the magnetic strip. In this example, there may not be any human readable value printed on the gaming voucher 10.

FIG. 2 shows the overall data structure 16 of a prior art gaming voucher redemption system for tracking issued gaming vouchers 10. As discussed above, the remote database of such a system includes at least the following information:

1. monetary value of gaming voucher
2. gaming machine (i.e., asset) that produced the gaming voucher
3. date and time of issuance of the gaming voucher
4. redemption status of the gaming voucher (i.e, redeemed, not yet redeemed)

Figure 3:
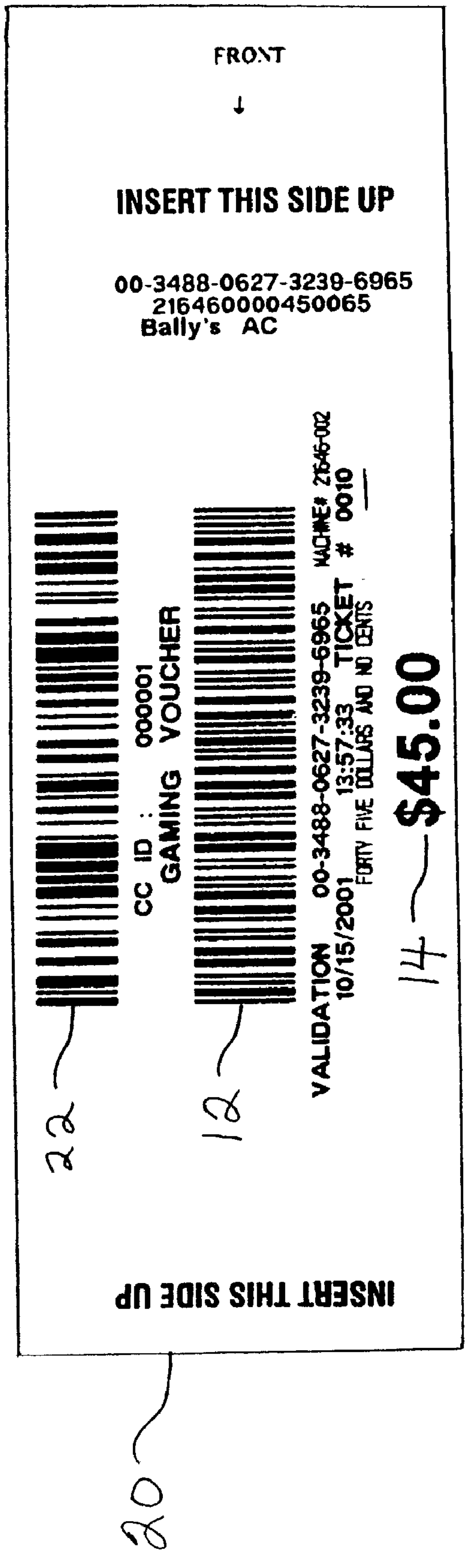
FIG. 3 is a gaming voucher in accordance with the present invention.

FIG. 3 shows a gaming voucher 20 in accordance with the present invention. In addition to the data elements of the conventional EZ Pay ticket voucher 10, the gaming voucher 20 includes a second machine readable indicia in the form of a secondary bar code symbol 22. The secondary bar code symbol is also referred to herein as the "top bar code." The secondary bar code symbol 22 has encoded therein at least the following information:

1. the asset number of the gaming machine that produced the gaming voucher 20
2. the monetary value of the gaming voucher 20
3. a portion of the unique gaming voucher number 12.

In one embodiment of the present invention, the portion of the unique gaming voucher number is the last two digits of the gaming voucher number. However, any portion may be used. The second or top bar code symbol in one embodiment of the gaming voucher 20 is a USS Code 128 bar code symbol.

The gaming voucher 20 may also use one or more magnetic strips in place of the bar codes. If so, then the first machine readable indicia will be the unique gaming voucher number encoded onto the magnetic strip and the second machine readable indicia will be the number represented by the secondary bar code symbol 22. Thus, whether the gaming voucher 20 uses bar codes or magnetic strips, the same information will be contained on the gaming voucher 20. The examples described hereafter refer only to the bar code embodiment. The equipment for printing, scanning and decoding bar codes, and for encoding and decoding magnetic strips is well-known and thus is not described in detail herein.

In addition to the three data items referred to above, the gaming voucher 20 includes additional data items in accordance with internal control procedures described in the Appendix.

An important feature of the present invention is that the secondary bar code symbol 22 allows the gaming voucher 20 to be self-validating when counted in a count room, while also providing additional security against fraud (e.g., counterfeiting) when validating gaming vouchers using data in the gaming voucher redemption system.

Figure 4:
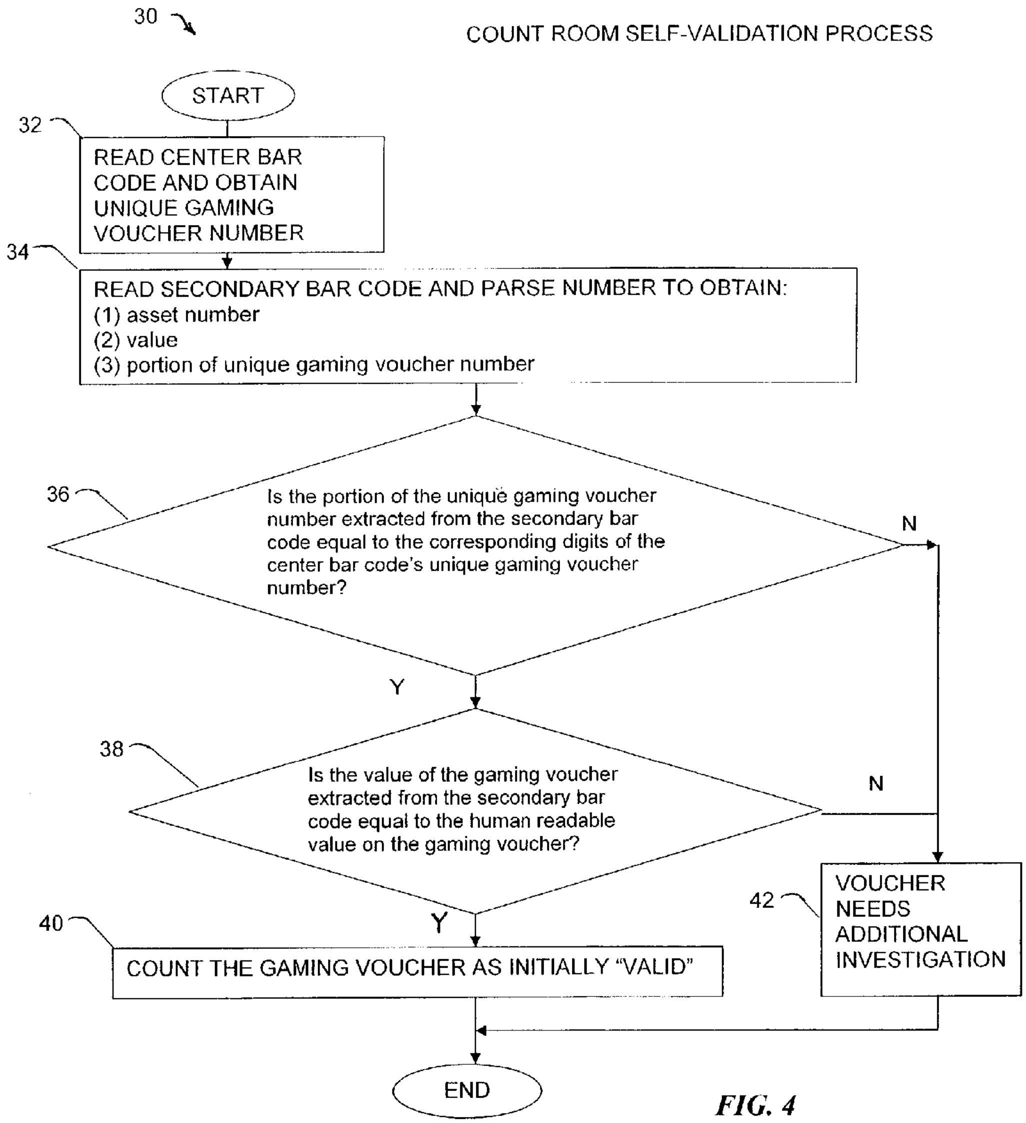
FIG. 4 is flowchart of a self-validating process for counting gaming vouchers in a count room in accordance with the present invention.

FIG. 4 is flowchart of a self-validating process 30 for counting gaming vouchers in a count room. As discussed above, the count room may not have access to the gaming voucher redemption system which contains all of the important data associated with the uniquely generated gaming voucher number represented by the center bar code symbol 12 (e.g., asset that produced the gaming voucher, monetary value of the gaming voucher) that is needed in the counting process. Accordingly, the secondary bar code is read, parsed and used to obtain this information, as well as to provide an initial verification that the gaming voucher 20 is authentic and has not been tampered with.

The self-validation process 30 begins by reading the two bar codes and extracting and parsing the read data to obtain the unique gaming voucher number from the center bar code symbol 12, and the asset number, monetary value, and portion of the unique gaming voucher number from the secondary bar code 22 (steps 32, 34).

Next, the portion of the unique gaming voucher number extracted from the secondary bar code 22 is compared to the corresponding digits of the entire unique gaming voucher number (step 36). If the numbers match, then the monetary value of the gaming voucher 20 extracted from the secondary bar code 22 is compared to the value printed in human readable form (step 38). If the monetary values match, then the gaming voucher is initially presumed to be valid and counted accordingly (step 40). These two steps may be performed in either order. Also, while it is preferred to perform the monetary value check, this step is optional. If either of these tests fail (step 42), then the gaming voucher must be further investigated. It may be initially counted as being invalid, or handled in accordance with established internal control procedures.

Additional checks may be performed on the gaming vouchers 20 which are not shown in FIG. 4 such as verifying expiration dates, and checking for other forms of printed indicia that must be present on a gaming voucher 20.

Figure 5A:
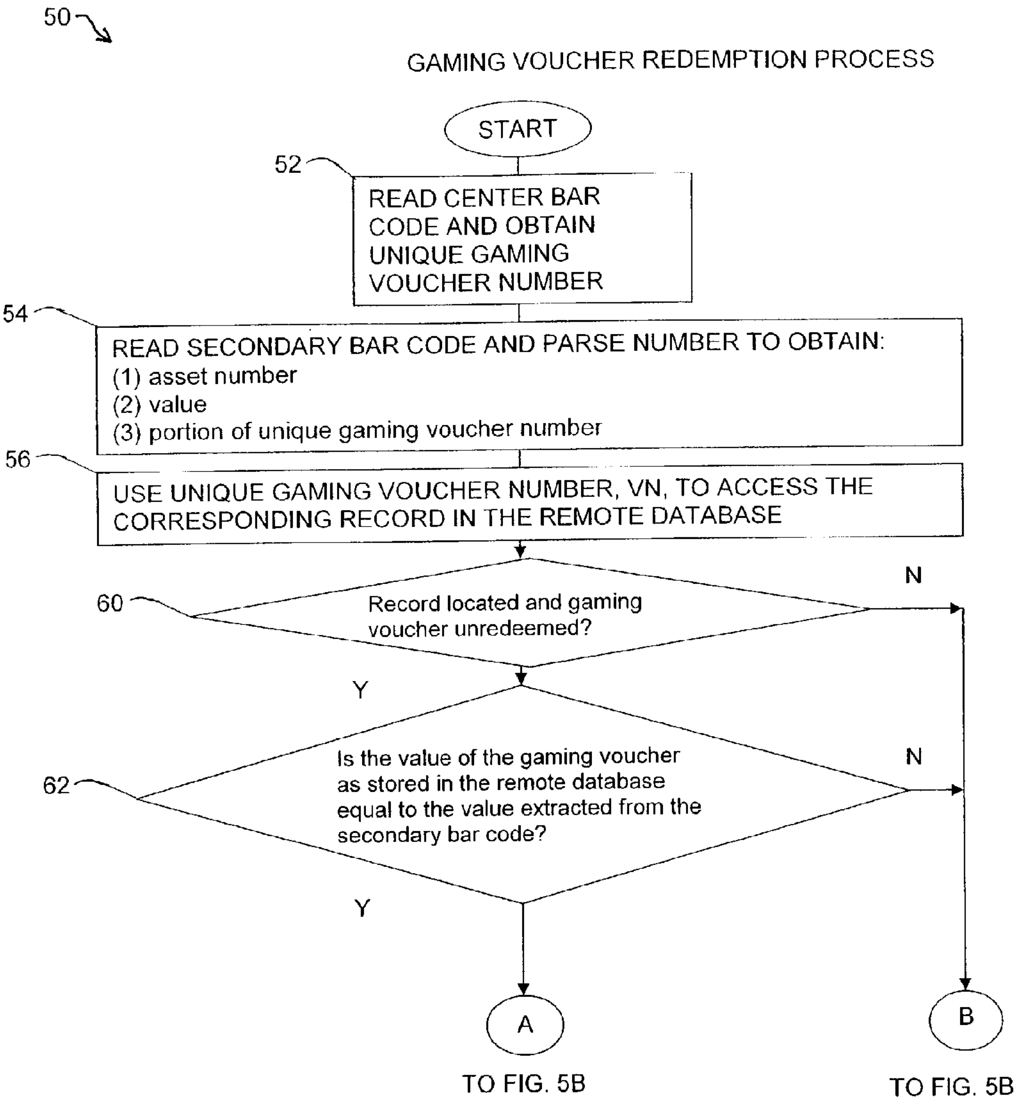
FIGS. 5A and 5B, taken together, is a flowchart of the process for redeeming gaming vouchers in accordance with the present invention.
Figure 5B:
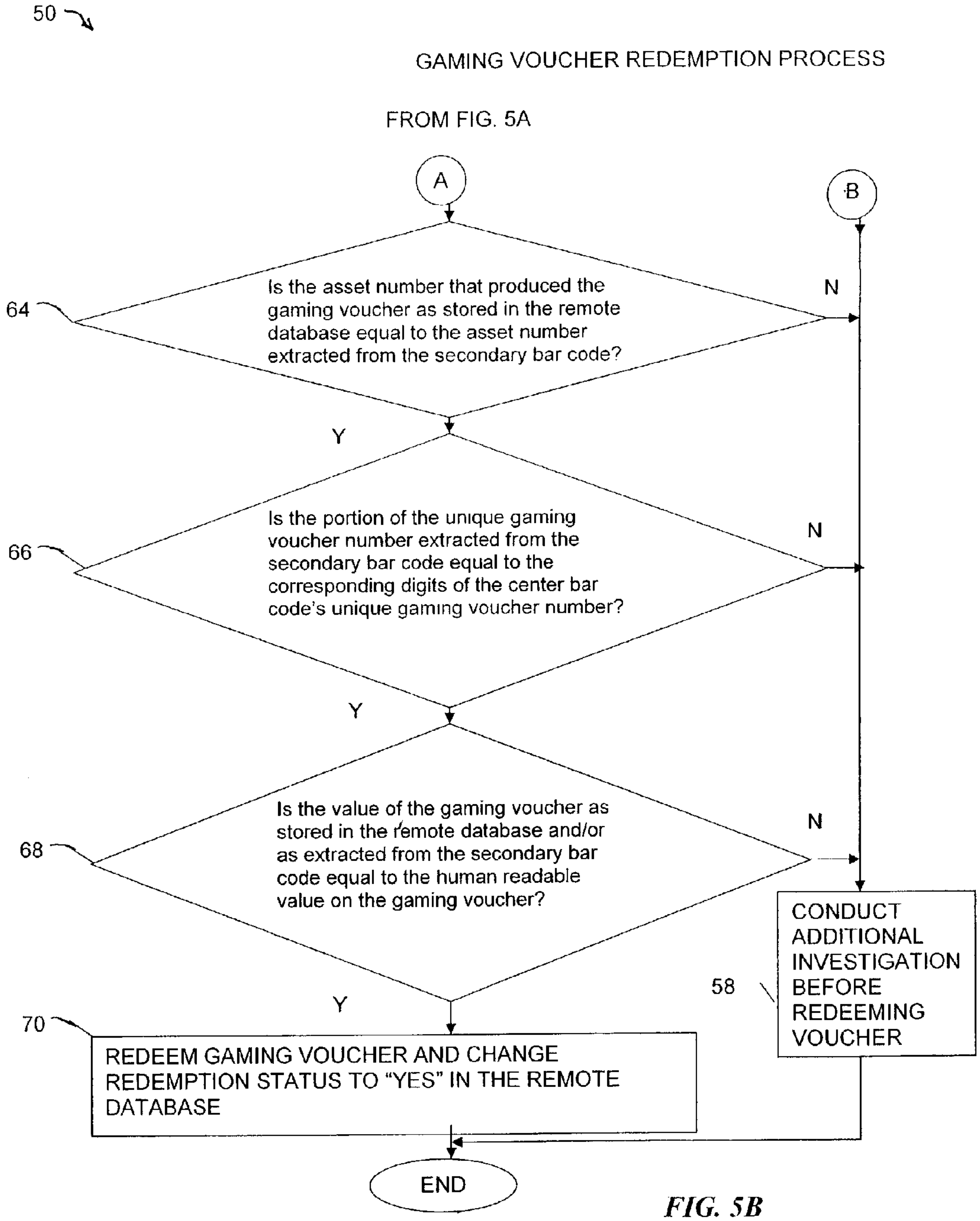

FIGS. 5A and 5B, taken together, is a flowchart of the process for redeeming gaming vouchers 20, either by feeding the gaming voucher 20 into a gaming voucher acceptor or bill validator at a gaming machine, or by handing the gaming voucher 20 to a cage window attendant or to a gaming floor attendant who has a wireless, portable terminal. All of these entities have electronic access to the remote database of the gaming voucher redemption system so that the value and authenticity of gaming vouchers presented for redemption can be immediately verified. The secondary bar code 22 provides an additional measure of protection against fraud by providing a check against the data in the remote database. In this manner, if the data in the remote database was altered, such as by changing the monetary value of an unredeemed gaming voucher 20, or if the gaming voucher was altered to indicate a different unique gaming voucher number that corresponds to a different unredeemed gaming voucher 20, then the data in the secondary bar code 22 would not match the data in the remote database, unless the secondary bar code 22 was also fraudulently produced to match the data in the remote database.

The redemption process 50 begins by reading the two bar codes and extracting and parsing the read data to obtain the unique gaming voucher number from the center bar code symbol 12, and the asset number, monetary value, and portion of the unique gaming voucher number from the secondary bar code 22 (steps 52, 54). The unique gaming voucher number is then used to access the corresponding record in the remote database (step 56, FIG. 2). If no record is found for the gaming voucher number, or if the record is showing that the gaming voucher 20 has been previously redeemed, then the gaming voucher 20 is not immediately redeemed and an additional investigation is undertaken regarding the gaming voucher 20 (step 58). If a record is found for the gaming voucher, and the gaming voucher has not yet been redeemed (step 60), then some or all of the data obtained from the secondary bar code 22 are compared to the corresponding data in the remote database to determine if the gaming voucher 20 is valid. The comparisons include comparing the monetary value (step 62), the asset that produced the gaming voucher (step 64), and the corresponding portion of the unique gaming voucher number (step 66). For machine only redemptions, the comparisons use only the data extracted and parsed from the two bar codes. For redemptions made by employees, the comparisons may additionally rely upon visual inspections of human readable indicia, such as the monetary value, vs. the monetary values obtained from one or both of the bar codes (step 68). The electronic comparisons may be performed in the same computers that are used to redeem gaming vouchers in a conventional system, such as EZ Pay or as described in U.S. Pat. No. 6,048,269. If no discrepancies are detected from the comparisons, then the gaming voucher 20 is immediately redeemed and the redemption status of the gaming voucher 20 in the remote database is changed to "yes" (step 70).

The presence of the secondary bar code 22 does not preclude a gaming operator from using the center bar code 12 in the conventional (prior art) manner for gaming voucher redemptions. That is, the secondary bar code 22 may be used only for the count room procedures, and not for independent verification during patron redemption of gaming vouchers 22.

The Appendix includes excerpts of internal control procedures that are used by gaming establishments owned by Park Place Entertainment in the State of New Jersey. The internal control procedures allows the present invention to be implemented in gaming jurisdictions that have established additional requirements for use of EZ Pay gaming vouchers and similar types of gaming vouchers.

The present invention may be implemented with any combination of hardware and software. If implemented as a computer-implemented apparatus, the present invention is implemented using means for performing all of the steps and functions described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX (a) In conjunction with the requirements of N.J.A.C. 19:45-1.36 for a hopper and either a slot drop bucket or slot drop box, Bally's Atlantic City may issue a Gaming Voucher to automatically pay a the amount on a credit meter, which gaming voucher shall be dispensed automatically from a slot machine to a patron, provided that:

1. The slot machine satisfies the requirements of N.J.A.C. 19:45-1.37(b)5 and (e)4, and such slot machine is connected to the EZ Pay Ticket System, a computerized gaming voucher system that satisfies the requirements of N.J.A.C. 19:45-1.55;
2. The design specifications of the gaming voucher are submitted to and approved by the Commission prior to issuance, which specifications shall comply with the requirements of (b) below;
3. Each gaming voucher is redeemable only in accordance with the requirements of (c) through (e) below and shall not expire; however Park Place and Wild West will restrict the redemption of a gaming voucher at a slot machine to a period of 90 days.
4. No gaming voucher results in a deduction from gross revenue unless the voucher is redeemed, the EZ Pay Ticket System is used to verify the validity of the serial number and value of the voucher, which verification will be performed upon redemption except as provided in (d)6 below and the voucher is forwarded to the casino accounting department in accordance with section 1.35C of this submission. For redemption of gaming vouchers at the slot booths see 1.35C of this submission. For gaming vouchers accepted through bill changers see Exhibit B to section 1.33;
5. In addition to the requirements of (a)4 above, no gaming voucher redeemed at a slot machine results in a deduction from gross revenue unless the gaming voucher is counted in the count room in accordance with the requirements of N.J.A.C. 19:45-1.33 and Exhibit B to 1.33 of this submission; and
6. Bally's Park Place and Wild West have approved internal controls in accordance with the requirements of this chapter.

(b) Each Gaming Voucher shall be designed and manufactured with sufficient graphics or other security measures, so as to permit to the greatest extent possible, the proper verification of the gaming voucher, and shall contain, the following information:

1. The name "Bally's A C" as printed by the EZ Pay System;
2. The date and time of issuance;
3. The value of the voucher, in both numbers and words;
4. The CVT id number (CCID:);
5. The sequential number of the gaming voucher issued by the slot machine (Ticket #);
6. A unique serial number, referenced to as the "validation code", which shall appear under the center bar code and on the top side of the gaming voucher and shall:
   i. Be automatically generated by the EZ Pay System;
   ii. Contain a unique site #148 for Bally's Park Place and the Wild West. The unique site ID is encrypted in the center bar code and is part of the 20 digit sequence number in the validation id#. The unique site ID is not visible on the gaming voucher;
   iii. Comply with the requirements of N.J.A.C. 19:45-.55(e)1;
7. The asset number of the slot machine that issued the gaming voucher is located on the gaming voucher in the five digit numerical field located next to the text "Machine ID". The last three digits of this field represent the position of the slot machine on the fiber loop to the CVT. The asset number is also encoded in the top barcode number;
8. The asset #of the slot machine that printed the gaming voucher (five digit field), the dollar value of the gaming voucher (8 digit field) and the last two digits of the serial number will be printed on the side of the gaming voucher.
9. Have an anti-counterfeiting measure on the gaming voucher as approved by the Commission;
10. The locations where the voucher may be redeemed and notice that redemption of a gaming voucher at a slot machine is restricted to a period of 90 days; and
11. A center bar code which shall enable the system to identify the numeric information in (b) 1 through 5 above when the voucher is subsequently presented for redemption. A top barcode which shall enable the SDS system via the Multiscan to identify the value and asset number of the slot machine that printed the gaming voucher when counted in the count room in accordance with Exhibit B to 1.33 or at the slot cage in accordance with 1.35C.

(c) Each gaming voucher shall be redeemed by a patron for a specific value of cash, coin or slot tokens in the amount of the gaming voucher surrendered, gaming voucher credits, or slot tokens, which value shall not exceed $3,000. Bally's Park Place and Wild West will not redeem a gaming voucher if:

1. The gaming voucher presented for redemption is materially different from the sample of the gaming voucher approved by the Commission pursuant to this section; or
2. The gaming voucher was previously redeemed.

(d) Park Place and Wild West shall follow a system of internal controls for the issuance and redemption of gaming vouchers, as follows:

1. Upon the presentation of a gaming voucher for redemption, the slot cashier, or slot machine shall use the EZ Pay system to verify the validity of the serial number and value of the voucher, and if valid, the EZ Pay system shall immediately cancel the voucher electronically and permit the redemption of such voucher for the value printed thereon as follows.

Each EZ Pay slot machine is connected to a Clerk Validation Terminal (CVT). The slot machine communicates to the CVT using the IGT Slot Accounting System (SAS) protocol. Up to 50 slot machines communicate with one CVT through a daisy chained fiber optic loop. The CVT in turn communicates with a Front End Processor (CFE) and the Front End Processor in turn communicates with the EZ Pay server (XVU). From the server, a network of cashier, auditor, Soft Count, and administration computers are connected.

When an EZ Pay slot machine prints a gaming voucher, the information is delivered to the CVT and redundantly stored in the CVT's battery backed memory. Approximately 19,000 unpaid gaming vouchers can exist in the CVT at one time. If the CVT is approaching 19,000 unpaid gaming vouchers the CVT sends the information from the oldest gaming voucher to the XVU. These tickets can then only be redeemed by a cashier. Paid voucher transactions are stored only in the system XVU and are purged from the CVT. The following information is printed by the slot machine and sent to the CVT using the SAS protocol as explained further in Section 1.55(d) of this submission:

i. Cash out value (The cash out value originates at the slot machine based upon the number of credits on the credit meter of the slot machine);

ii. Date and time the gaming voucher was printed; (The generation of date and time by the slot machine occurs at the time the gaming voucher is printed. Periodically, the CVT will update the machines' date and time information to synchronize all machines on the system);

iii. Asset number of the slot machine (A member of the slot department enters the slot machine's asset number into an EZ Pay System machine enrollment screen as outlined in section 1.55 H of this submission. The EZ Pay system dispatches this information to the appropriate CVT, and the CVT in turn provides this information to the appropriate slot machine); and iv. A sequence #. (The generation of the sequence number by the slot machine is based on information supplied by the CVT and the EZ Pay system. Please see Section 1.55, exhibit M EZ Pay overview for additional details. The sequence number located on the gaming voucher is a value, which is incremented each time a gaming voucher is printed by the slot machine. When the slot machine's memory is cleared, the sequence number is reset to 1. This number will roll over to zero when it reaches the maximum value, of 9,999. Currently, the largest number of tickets issued by a slot machine per day is approximately 18. Using this value, the sequence number should roll over once every 555 days.)

The CVT sends the information detailed above to the Digi Etherlite (terminal server) and the Digi Etherlite sends the information to the XUV. The XUV is used to cross validate gaming voucher information sent from the slot machines and CVT's. The role of the CVT, Digi Etherlite, CFE and XUV are explained in exhibit M to section 1.55 of this submission.

When a gaming voucher is inserted in a slot machines bill validator, the bill validator scans the center barcode, and sends the validation number to the slot machine, which in turn sends the validation number to the CVT. The CVT sends the validation number to the Digi Etherlite, the Digi Etherlite sends the information to the XVU and issuing CVT. The XVU makes the decision to redeem the gaming voucher based on a comparison of information contained in the SQL database and the issuing CVT. If the gaming voucher is valid the XVU sends the validation number and the value of the gaining voucher to the CFE and the CEE sends the information to the redeeming CVT When the redeeming CVT authorizes the slot machine to accept the gaming voucher, the slot machine will receive the amount from the redeeming CVT, direct the bill acceptor to stack the voucher, and then post the credits to the credit meter. The entire amount of the gaming voucher is sent to the slot machine. The slot machine will determine if the credit amount is not evenly divisible by the slot machine's denomination, the slot machine will accept the transfer amount and immediately issue a ticket for the fractional credit balance. (For example, a ticket in the amount of $49.95 is accepted by a slot machine that is a quarter denomination, the machine will credit $49.75 to the credit meter and issue a ticket for $.20 to the player.)

If the gaming voucher is not valid only the validation number is sent (not the value) and the gaming voucher is rejected and credits are not posted to the slot machine.

For gaming vouchers redeemed by a slot cashier, the slot cashier will scan or manually enter the sequence number (validation #) from the center bar code into an IGT Ticket Validation Cashier Station Terminal. The terminal is connected to the XVU, via network. For details on the communication and type of network refer to exhibit M to 1.55 of this submission.

The Ticket Validation Cashier Station sends the validation number to the XVU and issuing CVT. If the gaming voucher is valid the XVU sends the validation number and the value of the gaming voucher to the Ticket Validation Cashier Station. Detail procedures for the redemption of gaming vouchers by slot cashiers are detailed in 1.35C of this submission.

2. Park Place and Wild West shall maintain a record of all transactions in the system XVU until such time that the commission approves a revised internal control submission that permits the removal of records from the system and specifies procedures for the storage and control of such records;

3. Park Place and Wild West shall maintain all information required by (b)1 through 5 above for gaming vouchers that have been issued but not yet redeemed, which shall be stored in the system XVU until such time that the Commission approves a revised internal control submission that permits the removal of the information from the system and specifies procedures for the storage and control of such information, Access to this information is addressed in Section 1.55 of this submission 4. At the end of each gaming day, a casino accounting representative shall generate from the EZ Pay System the following reports for purposes of the reconciliation required by (g) below and shall thereafter be maintained in accordance with the provisions of N.J.A.C. 19:45-1.8. For purposes of the 19:45 regulations the gaming day for the EZ Pay reports listed below is the "Bus Day Begin".

i. Ticket Issuance Report—to print this report the accounting representative will sign on to the EZ Pay personal computer located in accounting and enter their user name and password. (Procedures for issuing passwords and assigning user functions are outlined in 1.55 of this submission.) After signing on the Menu screen will be displayed. The accounting representative will click the Audit icon and the Audit Menu screen will be displayed. The accounting representative will click on Ticket Issuance Report. A Ticket issuance Report window is displayed that prompts the user to enter a starting and ending date. The accounting representative will then click on detail and the Ticket Issuance Report prints and details the following information:

1. Current date and time;
2. Version of EZ Pay software;
3. The beginning and ending date the report covers. (Bus Day Begin and Bus Day End);
4. The asset number of the slot machine that issued the gaming voucher (VGM#);
5. The ticket sequence number (This is the sequential number of gaming vouchers issued by the slot machine);
6. The date and time the gaming voucher was printed;

7. The value of the gaming voucher;
8. The number of gaming vouchers printed and their total value by slot machine (Ticket count);
9. The system total (Total dollar value of gaming vouchers issued by the slot machines);
10. Handpay amount (This amount represents hard paid jackpots and is not used);
11. Total number of slot machines detailed on the report (VGM COUNT);
12. Total number of gaming voucher printed (Ticket Count); and
13. Signature of casino accounting representative.

ii. Ticket Redemption Report—To print this report the accounting representative clicks on Ticket Redemption Report from the Audit Menu. The accounting representative then enters the starting and ending date on the Ticket Redemption Report window displayed. The accounting representative verifies that CC's (CVT redemptions), VGM'S (Slot Machine redemptions) and User's (Cashier redemptions) are checked off on the screen and clicks detail. The Ticket Redemption Report will then print and detail the following information:

1. Current date and time;
2. Version of EZ Pay software;
3. The beginning and ending date the report covers, (Bus Day Begin and Bus Day End);
4. The asset number of the slot machine (VGM), CVT number (CC) or Cashier Name (User) that redeemed the gaming voucher;
5. The redeemed gaming voucher serial #(Validation Code);
6. The date and time the gaming voucher was redeemed;
7. The value of the gaming voucher;
8. The total number of gaming vouchers redeemed by each slot machine, CVT or Cashier (Ticket Count);
9. The dollar value of gaming vouchers redeemed by each slot machine, CVT or Cashier;
10. Total number of gaming vouchers redeemed by all slot machines, CVT's and Cashier's,
11. Total value of gaming vouchers redeemed by all slot machines, CVT's and Cashier's;
12. A summary total of the number of and value of gaming vouchers redeemed by the slot machines, CVT's or Cashier's;
13. The total number and dollar value redeemed for the gaming day;
14. A signature line for the casino representative; and
15. A signature line for the casino accounting supervisor.

We claim:

1. A method of verifying the authenticity and value of gaming vouchers output from a gaming machine, the method comprising:

(a) printing a first machine readable indicia on the gaming voucher, the first machine readable indicia representing a unique gaming voucher number and not including data representing the value of the gaming voucher;

(b) storing the value of the gaming voucher in a database remote from the gaming machine in association with the unique gaming voucher number;

(c) printing a second machine readable indicia on the gaming voucher, the second machine readable indicia representing at least:

(i) the value of the gaming voucher; and (ii) a portion of the unique gaming voucher number;

(d) outputting the gaming voucher containing the first and second machine readable indicia from the gaming machine;

(e) reading the first and second machine readable code during a voucher redemption process; and (f) comparing the data in the second machine readable indicia to the data in the remote database to verify the authenticity and value of the gaming voucher, wherein the first and second machine readable indicia are bar code symbols.

2. The method of claim 1 wherein the first bar code symbol is a USS-I 2/5 type bar code and the second bar code symbol is a USS Code 128 bar code symbol.

3. The method of claim 1 wherein the portion of the unique gaming voucher number is the last two digits of the gaming voucher number.

4. The method of claim 1 wherein step (b) further comprises storing the asset number of the gaming machine that produced the gaming voucher in the database remote from the gaming machine in association with the unique gaming voucher number, and in step (c) the second machine readable indicia further representing (iii) the asset number of the gaming machine that produced the gaming voucher, wherein step (f) further comprises using the gaming machine asset number data in the second machine readable indicia and the remote database to verify the authenticity of the gaming voucher.

5. The method of claim 1 wherein the gaming voucher is output when a game is won, the value of the gaming voucher being equal to the value of the won game.

6. The method of claim 1 wherein the gaming voucher is output when a player cashes out of the gaming machine, the value of the gaming voucher being equal to a credit balance at the gaming machine upon cash out.

7. A method of printing gaming vouchers output from a gaming machine that can have their authenticity and value verified during a voucher redemption process, the method comprising:

(a) printing a first machine readable indicia on the gaming voucher, the first machine readable indicia representing a unique gaming voucher number and not including data representing the value of the gaming voucher, the value of the gaming voucher being stored in a database remote from the gaming machine in association with the unique gaming voucher number;

(b) printing a second machine readable indicia on the gaming voucher, the second machine readable indicia representing at least:

(i) the value of the gaming voucher; and (ii) a portion of the unique gaming voucher number; and (c) outputting the gaming voucher containing the first and second machine readable indicia from the gaming machine, wherein during a voucher redemption process, the first and second machine readable code may be read and the data in the second machine readable indicia may be compared to the data in the remote database to verify the authenticity and value of the gaming voucher, wherein the first and second machine readable indicia are bar code symbols.

8. The method of claim 7 wherein the first bar code symbol is a USS-I 2/5 type bar code and the second bar code symbol is a USS Code 128 bar code symbol.

9. The method of claim 7 wherein the portion of the unique gaming voucher number is the last two digits of the gaming voucher number.

10. The method of claim 7 wherein the asset number of the gaming machine that produced the gaming voucher is stored in the database remote from the gaming machine in association with the unique gaming voucher number, and in step (b) the second machine readable indicia further representing (iii) the asset number of the gaming machine that produced the gaming voucher, wherein during the voucher redemption process, the gaming machine asset number data in the second machine readable indicia and the remote database may be compared to verify the authenticity of the gaming voucher.

11. The method of claim 7 wherein the gaming voucher is output when a game is won, the value of the gaming voucher being equal to the value of the won game.

12. The method of claim 7 wherein the gaming voucher is output when a player cashes out of the gaming machine, the value of the gaming voucher being equal to a credit balance at the gaming machine upon cash out.

* * * * *